United States Patent [19]

Chiba et al.

[11] Patent Number: 4,471,088
[45] Date of Patent: Sep. 11, 1984

[54] COPOLYAMIDE FROM 1,4-CYCLOHEXANE DICARBOXYLIC ACID AND DIAMINE MIXTURE

[75] Inventors: Kazumasa Chiba, Nagoya; Nobuo Kato, Aichi; Kazuhiko Kobayashi, Nagoya, all of Japan

[73] Assignee: Toray Industries, Inc., Tokyo, Japan

[21] Appl. No.: 393,073

[22] Filed: Jun. 28, 1982

[30] Foreign Application Priority Data

Jun. 29, 1981 [JP] Japan .................................. 56-99770
Jun. 29, 1981 [JP] Japan .................................. 56-99771

[51] Int. Cl.$^3$ ............................................. C08G 69/26
[52] U.S. Cl. ..................................... 524/606; 524/413; 524/433; 524/437; 528/324; 528/338; 528/339; 528/340; 528/346
[58] Field of Search ............... 528/346, 340, 324, 338, 528/339; 524/606, 413, 425, 433, 437

[56] References Cited
U.S. PATENT DOCUMENTS
3,629,053 12/1971 Kimura et al. ...................... 528/346

Primary Examiner—Harold D. Anderson
Attorney, Agent, or Firm—Austin R. Miller

[57] ABSTRACT

A copolyamide comprised of undecamethylenehexahydroterephthalamide units and hexamethylenehexahydroterephthalamide units having a trans isomer ratio of hexahydroterephthalic acid residues of 57 to 83 percent is provided. The copolyamide is suitable for injection and extrusion molding. The copolyamide is prepared by a process comprising heating an equimolar salt of undecamethylenediamine and hexahydroterephthalic acid and an equimolar salt of hexamethylenediamine and hexahydroterephthalic acid at a maximum temperature of about 280 to 360° C. to stably melt-polymerize the copolyamide. A copolyamide molding composition comprised of the copolyamide and an inorganic reinforcing agent can be formed into various molded articles having excellent properties.

6 Claims, 1 Drawing Figure

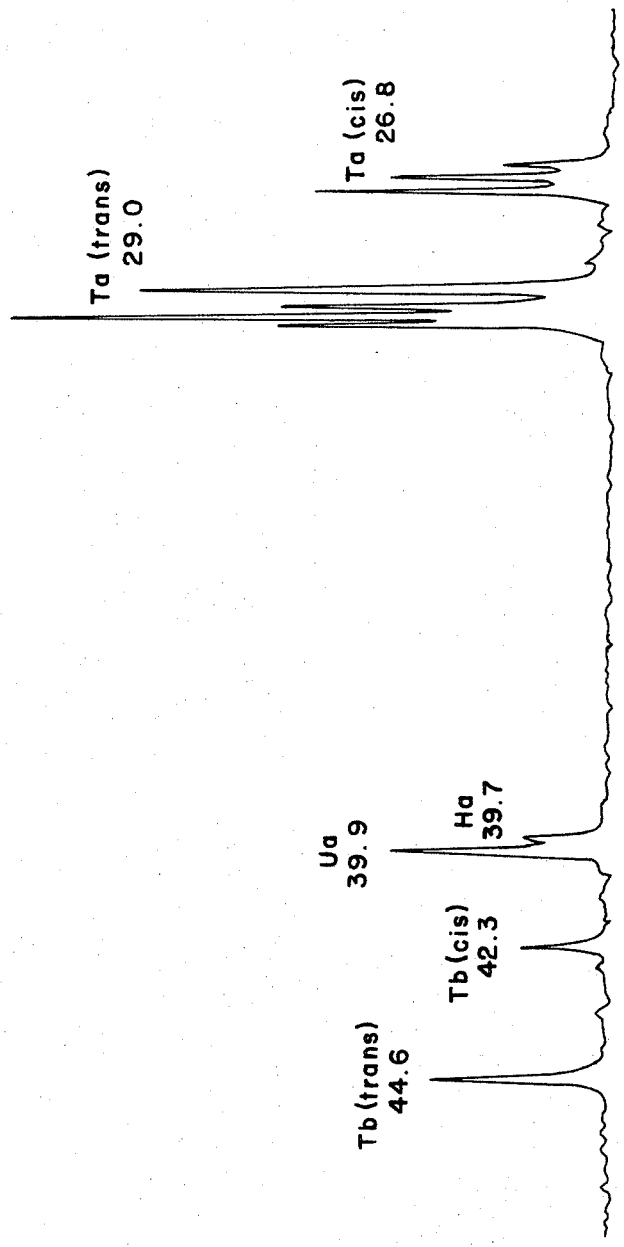

4,471,088

COPOLYAMIDE FROM 1,4-CYCLOHEXANE DICARBOXYLIC ACID AND DIAMINE MIXTURE

BACKGROUND OF THE INVENTION

1. Field of the Invention

The present invention relates to a copolyamide having a novel geometrical isomer ratio, to a process for producing the same and to a molding composition containing the novel copolyamide. The copolyamide and copolyamide composition of the present invention are useful for making molded articles such as machinery parts, electrical parts, and automobile parts.

2. Description of the Prior Art

Polyamides have excellent mechanical properties, chemical resistance, dyeability, and shapability. Utilizing these properties, polyamides have been used for fabricating various shaped articles such as textile products, films and molded parts. Various kinds of polyamides have been investigated for many purposes and required end use properties. Aliphatic polyamides such as polycaproamide (hereinafter referred to as nylon 6), polyhexamethyleneadipamide (hereinafter referred to as nylon 66) are now manufactured on a large industrial scale and used commercially. However, these aliphatic polyamides have the disadvantage that they are not always satisfactory when used for various machinery parts and automobile parts which require high rigidity and excellent dimensional stability.

These aliphatic polyamides have relatively low glass transition temperature. Therefore, the rigidity of molded articles produced from these aliphatic polyamides deteriorates significantly at higher circumambient temperatures, for example, temperatures above 60° C., and the heat distortion temperature is relatively low. The humidity absorption of the aliphatic polyamides is relatively high, and, thus, the rigidity and dimensional stability show severe deterioration due to absorption of atmospheric humidity.

In order to improve the above-mentioned disadvantages of aliphatic polyamides, polyamides containing cyclic structural units such as aromatic and alicyclic units, in their main chain have been investigated. In particular, an alicyclic polyamide comprising a long chain aliphatic diamine having 11 to 13 carbon atoms and hexahydroterephthalic acid, has a high Young's modulus and is used as a raw material for producing textile fabrics having an excellent hand touchness, as described in, for example, Published Examined Japanese Patent Applications No. 29447/72 and No. 29047/72.

As hexahydroterephthalic acid exists originally in geometrical isomers, the mechanical and thermal properties of polyamides containing hexahydroterephthalic acid as one component, may depend on the trans isomer ratio of the hexahydroterephthalic acid residues in the polyamide. It is reported that heat supplied during melt-polymerization can result in isomerization of the hexahydroterephthalic acid residues in the polyamide to produce trans form hexahydroterephthalic acid residues in the polyamide, independent of the trans isomer ratio of the starting hexahydroterephthalic acid material.

However, the toughness of polyamides containing only trans isomer of the hexahydroterephthalic acid residues is poor, precluding their use in various molded articles.

Thus, improvement of the toughness of the polyamide principally consisting of an aliphatic diamine having 11 to 13 carbon atoms and hexahydroterephthalic acid is necessary while maintaining the inherent excellent rigidity, heat resistance and dimensional stability. This object can be achieved by manipulation of the trans isomer ratio of hexahydroterephthalic acid residues in the polyamide.

OBJECT OF THE INVENTION

An object of the present invention is to provide a copolyamide having a novel specified geometrical isomer ratio, which is suitable for injection and extrusion molding.

Another object of the present invention is to provide a copolyamide which can be made into various molded articles, using conventional molding methods, with the molded articles having excellent toughness and a high heat distortion temperature.

A further object of the present invention is to provide a process for producing the copolyamide by stable melt-polymerization with prevention of gelation and decomposition.

A still further object of the present invention is to provide a reinforced copolyamide composition which can be made into various molded articles having an extremely high heat distortion temperature and good surface appearance by injection molding processes even at ordinary mold temperatures of below 100° C.

Other objectives and advantages of the present invention will be apparent from the following descriptions.

BRIEF SUMMARY OF THE INVENTION

In accordance with the present invention, there is provided a copolyamide comprising substantially from about 95 to 65 percent by weight of undecamethylenehexahydroterephthalamide units and from about 5 to 35 percent by weight of hexamethylenehexahydroterephthalamide units, the copolyamide having a trans isomer ratio of hexahydroterephthalic acid residues represented by the following equation (I):

$$57 \leq \frac{t}{c+t} \times 100 \leq 83 \, (\%) \tag{I}$$

wherein c denotes the cis isomer content and t denotes the trans isomer content.

In accordance with the present invention, there is also provided a process for producing the copolyamide of the present invention which comprises heating a molten mixture comprising substantially from about 96 to 65 parts by weight of an equimolar salt of undecamethylenediamine and hexahydroterephthalic acid and from about 5 to 35 parts by weight of an equimolar salt of hexamethylenediamine and hexahydroterephthalic acid to a maximum temperature of about 280° to 360° C.

In accordance with the present invention, there is further provided a copolyamide molding composition comprised of about 100 parts by weight of the copolyamide of the present invention and from about 10 to 100 parts by weight of an inorganic reinforcing agent.

BRIEF DESCRIPTION OF THE DRAWINGS

FIG. 1 illustrates a representative $^{13}$C-nuclear magnetic resonance spectrum chart of the present copolyamide; this chart shows the spectrum of a copolyamide comprising 80 percent by weight of undecamethylenehexahydroterephthalamide units and 20 percent by weight of hexamethylenehexahydroterephthalamide units measured at 140° C. on about a 30 percent solution of the copolyamide in orthochlorophenol.

DETAILED DISCLOSURE OF THE INVENTION

A process for producing a copolyamide, the copolyamide obtained according to the process and a copolyamide molding composition containing an inorganic reinforcing agent are described herein.

In the process for producing a copolyamide, the starting materials for the copolyamide, undecamethylenediamine, hexamethylenediamine and hexahydroterephthalic acid are first prepared. The undecamethylenediamine, hexamethylenediamine and hexahydroterephthalic acid may be prepared by conventional methods. For example, undecamethylenediamine can be produced by decarboxylated dimerization of ε-caprolactam and subsequent reduction. Hexahydroterephthalic acid can be produced by hydrogenation of terephthalic acid.

An equimolar salt of undecamethylenediamine and hexahydroterephthalic acid and an equimolar salt of hexamethylenediamine and hexahydroterephthalic acid are then prepared. These salts can be easily obtained by mixing undecamethylenediamine, hexamethylenediamine and hexahydroterephthalic acid in the presence of water. The mixture of the equimolar salts of undecamethylenediamine, hexamethylenediamine and hexahydroterephthalic acid may be polymerized in the molten state by using any conventional polymerization process. The ratio of the equimolar salt of undecamethylenediamine and hexahydroterephthalic acid to the equimolar salt of hexamethylenediamine and hexahydroterephthalic acid should be from about 95:5 to 65:35, preferably from about 90:10 to 70:30 by weight. The melt-polymerization of the mixture must be carried out at maximum temperatures of about 280° to 360° C. The term "maximum temperature" means the highest temperature which the molten polymer in the polymerization vessel reaches during melt-polymerization. Since the molten polymer is usually gradually heated during polymerization, the temperature of the molten polymer is gradually elevated as time passes. Therefore, the term maximum temperature often means the final temperature the molten polymer reaches during melt-polymerization. If the maximum temperature is below 280° C., melt-polymerization cannot be carried out as the temperature is below the melting point of the copolyamide. If the maximum temperature is above 360° C., considerable decomposition of the copolyamide occurs, resulting in difficulties in stably melt-polymerizing the polymer. Furthermore, when the maximum temperature is either below 280° C. or above 360° C., a copolyamide having a trans isomer ratio of hexahydroterephthalic acid residues in the copolyamide within the required range of from 57 to 83 percent cannot be obtained.

The trans isomer ratio of hexahydroterephthalic acid residues in the copolyamide comprising substantially from about 95 to 65 percent by weight of undecamethylenehexahydroterephthalamide units and from about 5 to 35 percent by weight of hexamethylenehexahydroterephthalamide units is a function of the maximum temperature of the molten polymer, independent of the trans isomer ratio of the starting hexahydroterephthalic acid material. Hexahydroterephthalic acid residues cannot be isomerized to produce all trans form isomer during this melt-polymerization because the cis isomer content increases with higher maximum temperatures within the range from 280° to 360° C. The relationship between the trans isomer ratio of the hexahydroterephthalic acid residues in the copolyamide and the maximum temperature of the molten polymer can be expressed in accordance with the following equation (II):

$$85 - \frac{T}{90} \leq \frac{t}{c+t} \leq 105 - \frac{7}{90} T(\%) \quad \text{(II)}$$

wherein c denotes the cis isomer content, t denotes the trans isomer content and T denotes the maximum temperature.

Thus, the copolyamide having the desired trans isomer ratio of hexahydroterephthalic acid residues can be obtained by controlling the maximum temperature.

The copolyamide thus obtained comprises substantially undecamethylenehexahydroterephthalamide units and hexamethylenehexahydroterephthalamide units. The undecamethylenehexahydroterephthalamide unit is represented by the following formula:

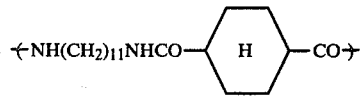

and the hexamethylenehexahydroterephthalamide unit is represented by the following formula:

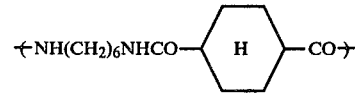

The copolyamide comprising substantially undecamethylenehexahydroterephthalamide units and hexamethylenehexahydroterephthalamide units does not have the disadvantages of the previously known polyamides. By selecting the hexamethylenehexahydroterephthalamide unit as a minor component of the copolyamide, high rigidity and good melt stability during polymerization and the shaping step can be achieved.

The following distinctions may be made between the copolyamide of the present invention and the previously known polyamides:

(A) Polyundecamethylenehexahydroterephthalamide has a lower glass transition temperature and a lower heat distortion temperature than the copolyamide of the present invention.

(B) Copolyamides containing aliphatic components such as caproamide, undecaneamide, dodecaneamide, hexamethyleneadipamide, and hexamethylenesebacamide have a lower glass transition temperature and a lower heat distortion temperature than the copolyamide of the present invention.

(C) Copolyamides containing terephthalic acid such as hexamethyleneterephthalamide, and undecamethyleneterephthalamide have poor melt stability and therefore, gelation easily occurs during melt-polymerization and melt-shaping processes. Copolyamides containing isophthalic acid such as hexamethyleneisophthalamide, and undecamethyleneisophthalamide do not possess high crystallinity and have a lower heat distortion temperature than the copolyamide of the present invention.

The copolyamide of the present invention comprises substantially from about 95 to 65 percent by weight, preferably from about 90 to 70 percent by weight of undecamethylenehexahydroterephthalamide units and substantially from about 5 to 35 percent by weight, preferably from about 10 to 30 percent by weight of hexamethylenehexahydroterephthalamide units. When the content of undecamethylenehexahydroterephthalamide units is greater than 95 percent by weight in the copolyamide, the heat distortion temperature of molded articles is not sufficiently high. If the content of undecamethylenehexahydroterephthalamide units is less than 65 percent by weight in the copolyamide, the melting point of the copolyamide is too high to achieve stable melt-polymerization and melt-molding of the copolyamide.

The trans isomer ratio of hexahydroterephthalic acid residues in the copolyamide of the present invention is from 57 to 83 percent. When the trans isomer ratio of hexahydroterephthalic acid residues in the copolyamide is greater than 83 percent, the toughness of the copolyamide is not sufficiently high for use in molded articles. When the trans isomer ratio of hexahydroterephthalic acid residues in the copolyamide is less than 57 percent, the crystallinity of the copolyamide deteriorates and the melting point of the copolyamide is too low to give satisfactory results.

The degree of polymerization of the thus obtained copolyamide is not limited. The relative viscosity of the copolyamide can be varied from about 1.5 to 5.0 depending on end use requirements. The copolyamide of the present invention may be optionally prepared in the presence of an additional small amount of another polyamide-forming component such as ε-caprolactam, ω-laurolactam, 11-aminoundecanoic acid, hexamethylenediammonium adipate, hexamethylenediammonium sebacate, etc. or may be mixed with other polymer materials in moderate amounts without greatly changing the essential characteristics of the copolyamide.

The trans isomer ratio of the hexahydroterephthalic acid residues in the copolyamide may be determined by spectroscopy. For example, the copolyamide is dissolved in orthochlorophenol and a $^{13}C$-nuclear magnetic resonance ($^{13}C$-NMR) measurement is carried out at an operating frequency of 25.05 MHz. The spectral chart thus obtained is shown in FIG. 1. In this spectrum chart, the absorption peak represented by "Ua ($\delta=39.9$ ppm)" is attributed to 1,11-carbon atoms of the undecamethylenediamine residue

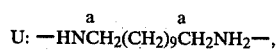

the absorption peak represented by "Ha ($\delta=39.7$ ppm)" is attributed to 1,6-carbon atoms of the hexamethylenediamine residue

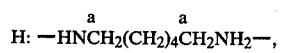

the absorption peak represented by "Ta(cis) ($\delta=26.8$ ppm)" is attributed to 2,3,5,6-carbon atoms of the cis isomer of the hexahydrorephalic acid residue

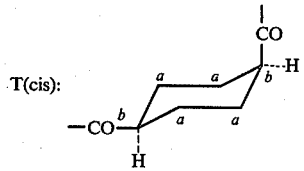

the absorption peak represented by "Ta(trans) ($\delta=29.0$ ppm)" is attributed to 2,3,5,6-carbon atoms of the trans isomer of the hexahydroterephthalic acid residue

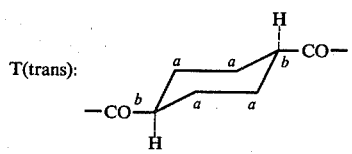

the absorption peak represented by "Tb(cis) ($\delta=42.3$ ppm)" is attributed to 1,4-carbon atoms of the cis isomer of the hexahydroterephthalic acid residue, and the absorption peak represented by "Tb(trans) ($\delta=44.6$ ppm)" is attributed to 1,4 carbon atoms of the trans isomer of the hexahydroterephthalic acid residue.

The isomer ratio of the hexahydroterephthalic acid residues in the copolyamide is determined by comparing peak areas of the two absorption peaks which are attributed to 1,4-carbon atoms of the cis ($\delta=42.3$ ppm) and trans ($\delta=44.6$ ppm) isomers of the hexahydroterephthalic acid residues.

The copolyamide of the present invention can be formed into a wide range of useful articles by conventional molding methods employed in the fabrication of thermoplastics, such as injection molding, extrusion molding and blow molding. Machinery parts, automobile parts and electrical parts obtained by injection molding or extrusion molding are particularly useful in practice.

The copolyamide of the present invention may contain other additives such as pigments, dyes, flame retarding agents, heat stabilizers, antioxidants, light stabilizers, lubricants, mold-releasing agents, antistatic agents, plasticizers and nucleating agents.

Another characteristic of the present invention resides in compounding inorganic reinforcing agents with the copolyamide comprising substantially from about 95 to 65 percent by weight of undecamethylenehexahydroterephthalamide units and from about 5 to 35 percent by weight of hexamethylenehexahydroterephthalamide units to improve rigidity and heat resistance. It is well known that mechanical and thermal properties of polyamides are effectively improved by the addition of inorganic reinforcing agents. Reinforced polyamide compositions have been widely used for fabricating various molded articles such as automobile parts, and machinery parts in place of metal materials, utilizing the following excellent characteristics, (1) extremely high rigidity and high heat distortion temperature and (2) low humidity absorption and good dimensional stability.

However, compositions comprising aliphatic polyamides such as nylon 6 and nylon 66 and inorganic reinforcing agents, are not always satisfactory materials for use in molded articles which require especially high rigidity and excellent dimensional stability at higher circumambient temperatures and humidity. On the other hand, reinforced polyamides containing cyclic structural units, such as aromatic and alicyclic units, can reduce the above-mentioned disadvantages, but a serious problem remains when such reinforced polyamides containing cyclic structural units are shaped by injection molding processes.

Generally, because polyamides containing cyclic structural units in the polymer main chain have comparatively high crystallization temperatures in addition to high glass transition temperatures, the mold temperature must be kept at a temperature higher than the crystallization temperature, such as above 100° C., in order to obtain injection molded articles having a high degree of crystallinity. When the mold temperature is lower than 100° C., the degree of crystallinity of the injection molded articles deteriorates, resulting in a low heat distortion temperature and poor dimensional stability. Thus, it has been generally accepted that only by using a high mold temperature, the reinforced polyamides containing cyclic structural units can be produced to obtain the inherent excellent characteristics of these reinforced polyamides.

For example, it is reported in Published Examined Japanese Patent Application No. 32458/79 that injection molded articles of a polymetaxylyleneadipamide composition containing inorganic reinforcing agents such as glass fibers had high heat distortion temperatures of above 200° C. when the mold temperature was kept at 130° to 150° C. On the other hand, the heat distortion temperature of injection molded articles shaped at a mold temperature of 80° C. was about 90° C. It is also reported that injection molded articles of the reinforced polymetaxylyleneadipamide composition had poor surface gloss when the mold temperature was below 100° C.

In practice, in order to keep the mold temperature above 100° C., temperature regulation systems with special equipment, such as oil lines or heating wires must usually be used. These apparatus result in disadvantages in economic efficiency and processability. Surprisingly, it has now found that the reinforced copolyamide composition comprising substantially from about 95 to 65 percent by weight of undecamethylenehexahydroterephthalamide unit and form about 5 to 35 percent by weight of hexamethylenehexahydroterephthalamide unit can be formed into injection molded articles which show extremely high heat distortion temperatures and excellent surface gloss even when the mold temperature is below 100° C. Therefore ordinary procedures can be employed in injection molding the reinforced copolyamide composition of the present invention. Of course, the mold temperature may be above 100° C. and under such conditions, various injection molded articles having extremely high heat distortion temperatures and excellent surface gloss can be also obtained.

This effect can be obtained in a copolyamide molding composition which comprises (a) about 100 parts by weight of copolyamide comprising substantially from about 95 to 65 percent by weight of undecamethylenehexahydroterephthalamide units and from about 5 to 35 percent by weight of hexamethylenehexahydroterephthalamide units and (b) from about 10 to 100 parts by weight of an inorganic reinforcing agent, the copolyamide having any trans isomer ratio of hexahydroterephthalic acid residues, but when the copolyamide has a trans isomer ratio of hexahydroterephthalic acid residues represented by the above-disclosed equation (I), it is more effective.

Representative examples of fibrous or finely divided reinforcing agents to be used in the present invention include glass fibers, carbon fibers, asbestos fibers, calcium metasilicate which is referred to as wollastonite, talc, calcium carbonate, magnesium oxide, aluminum oxide, mica, glass beads and potassium titanate whiskers. Inorganic reinforcing agents are used in an amount of from about 10 to 100 parts by weight based on 100 parts by weight of the copolyamide. When the amount of reinforcing agent is less than 10 parts by weight, the reinforcement effect is not sufficient. On the other hand, when the amount of reinforcing agent is greater than 100 parts by weight, the toughness of the composition deteriorates. Inorganic reinforcing agents can be added to the copolyamide by using conventional processes. An industrially advantageous process includes dry-blending pellets of the copolyamide with reinforcing agents in a mixing machine, such as a Henschel mixer. The mixture may then be heated and kneaded into a molten state by an extruder and thereafter be molded into shaped articles.

The reinforced copolyamide composition of the present invention can be formed into a wide range of useful articles by using conventional molding methods employed in the fabrication of thermoplastics. In particular, machinery parts and automobile parts obtained by injection or extrusion molding are useful in practice. The copolyamide molding composition of the present invention may optionally contain other additives such as pigments, dyes, flame retarding agents, heat stabilizers, antioxidants, light stabilizers, lubricants, mold-releasing agents, antistatic agents, plasticizers, nucleating agents and other polymer materials in moderate amounts without greatly changing the essential characteristics of the copolyamide molding composition of the present invention.

The following examples are set forth to illustrate the present invention and various embodiments thereof, but do not limit the scope of the invention as defined in the claims.

The copolyamides and copolyamide compositions described in the examples were characterized as follows:

1. Relative viscosities were measured at 25° C. in 98 percent sulfuric acid at a concentration of 1.0 gram/100 milliliters.
2. The melting point and glass transition temperature were determined using a differential scanning calorimeter (Perkin Elmer Co. DSC-1B) operating at a scan speed of 20° C./minute.
3. Elemental analyses were carried out using an organic micro analyzer (Yanagimoto Co. MU-2).
4. The trans isomer ratio of the hexahydroterephthalic acid residues in the copolyamide was determined by comparing the areas of peaks attributed to the 1,4-carbon atoms of the cyclohexane ring in each geometrical isomer in the $^{13}$C-NMR spectra. The $^{13}$C-NMR spectra were obtained on a JOEL FX-100 spectrometer (JOEL Limited) at 140° C. on solutions of about 30 percent in orthochlorophenol. Chemical shifts were reported in relation to internal tetramethylsilane. Fourier transform proton-noise-decoupled $^{13}$C-NMR spectra were obtained on 5,000 Hz sweeps that used 45° RF pulses.
5. Mechanical properties of injection molded specimens of the copolyamides and copolyamide compositions in the examples were measured according to the following ASTM procedures:

| Tensile strength: | ASTM D638 |
|---|---|
| Flexural strength & modulus: | ASTM D790 |
| Izod impact strength: | ASTM D256 |
| Heat distortion temperature: | ASTM D648 |
| Humidity absorption: | ASTM D570 |

EXAMPLE 1

A mixture of 89 parts by weight of undecamethylenediammoniumhexahydroterephthalate salt [hereinafter referred to as "11T(H)"] and 22.9 parts by weight of hexamethylenediammoniumhexahydroterephthalate salt [hereinafter referred to as "6T(H)"] were added together with 35 parts by weight of deionized water into a polymerization vessel equipped with a stirrer, an inert gas inlet and an inert gas outlet. After replacement of the air in the vessel with nitrogen, the mixture was heated to 210° C. over 2 hours with stirring. The polymerization was continued at a constant internal pressure of 17.5 kilograms/centimeter$^2$ for 2.5 hours, while the temperature of the molten mixture was raised to 300° C. The internal pressure was then gradually decreased to atmospheric pressure over 2 hours and then nitrogen was passed over the mixture for 0.5 hours. The highest temperature the molten mixture reached, i.e. the maximum temperature, was 323° C. The molten polymer was then discharged, water quenched and cut to give colorless granules of copolyamide. Elemental analysis revealed that the copolyamide thus obtained consisted of 80 percent by weight of 11T(H) units and 20 percent by weight of 6T(H) units.

The results of the elemental analysis are as follows:

|   | Calculated for 11T(H)/6T(H) = 80/20 weight percent (%) | Found (%) |
|---|---|---|
| C | 69.98 | 69.96 |
| H | 10.35 | 10.31 |
| N | 9.18 | 9.20 |

The relative viscosity of the copolyamide was 2.41. The melting point and glass transition temperature were 287° C. and 119° C., respectively. A $^{13}$C-NMR spectrum of this copolyamide measured in orthochlorophenol (30 weight/volume percent) at 140° C. is shown in FIG. 1. The trans isomer ratio of the hexahydroterephthalic acid residues in this copolyamide was determined to be 72 percent by comparing the areas of the absorption peaks attributed to 1,4-carbon atoms of the cyclohexane ring in the trans-($\delta$=44.6 ppm) and cis-($\delta$=42.3 ppm) isomers. These results satisfy equation (I).

The granules of this copolyamide were dried under vacuum at 100° C. for 24 hours, then injection molded to provide test-pieces as designated by ASTM. Injection molding was carried out at an injection temperature of 320° C. and a mold temperature of 80° C. Mechanical properties were measured according to ASTM procedures and the results are summarized in Table 1. This copolyamide proved to have a very high heat distortion temperature and other good mechanical properties.

EXAMPLE 2

A mixture of 77.9 parts by weight of 11T(H) salt and 34.3 parts by weight of 6T(H) salt was polymerized in a procedure similar to that described in Example 1 to give a copolyamide whose characteristics and mechanical properties are listed in Table 1.

TABLE 1

|   | Example 1 | Example 2 |
|---|---|---|
| Polyamide | | |
| 11T(H) (%) | 80 | 70 |
| 6T(H) (%) | 20 | 30 |
| Relative viscosity | 2.41 | 2.35 |
| Melting point (°C.) | 287 | 302 |
| Glass transition temp. (°C.) | 119 | 123 |
| Elemental analysis | | |
| Calcd. C (%) | 69.98 | 69.57 |
| H (%) | 10.35 | 10.25 |
| N (%) | 9.18 | 9.42 |
| Found C (%) | 69.96 | 69.55 |
| H (%) | 10.31 | 10.32 |
| N (%) | 9.20 | 9.46 |
| Trans/cis ratio ($^{13}$C-NMR) | | |
| trans-form content (%) | 72.0 | 69.6 |
| cis-form content (%) | 28.0 | 30.4 |
| Mechanical properties | | |
| Heat distortion temp. (°C.) | 116 | 121 |
| Tensile strength (kg/cm$^2$) | 805 | 810 |
| Flexural strength (kg/cm$^2$) | 1,100 | 1,100 |
| Flexural modulus (kg/cm$^2$) | 21,000 | 21,500 |
| Izod impact strength (kg cm/cm notch) | 5.2 | 6.0 |

COMPARATIVE EXAMPLE 1

The copolyamide and injection molded test-piece consisting of 80 percent by weight of 11T(H) units and 20 percent by weight of 6T(H) units, prepared in Example 1 were heated to 210° C. for 2 days while preventing thermal and thermo-oxidative decomposition. The trans isomer ratio of the hexahydroterephthalic acid residues in the copolyamide thus obtained was 95 percent. The izod impact strength of the molded test-pieces was only 2 kilogram centimeter/centimeter notch and the toughness was insufficient for the molded articles to be practicably useable.

COMPARATIVE EXAMPLE 2

A mixture of 89 parts by weight of the 11T(H) salt and 22.9 parts by weight of the 6T(H) salt described in Example 1 was polymerized at a maximum temperature of 400° C. The trans isomer ratio of hexahydroterephthalic acid residues in this copolyamide was 55 percent and the melting point of the copolyamide was 266° C.

COMPARATIVE EXAMPLE 3

100 parts by weight of 11T(H) salt and 25 parts by weight of deionized water were added to the polymerization vessel and polymerization was carried out using a procedure similar to that of Example 1. The relative viscosity, melting point and glass transition temperature of the thus-obtained polyundecamethylenehexahydroterephthalamide were as follows:

| Relative viscosity: | 2.40 |
|---|---|
| Melting point: | 308° C. |
| Glass transition temperature: | 103° C. |

Mechanical properties of this polyamide were measured as described in Example 1. The heat distortion temperature of this polyamide was 98° C., and it was found that this polyundecamethylenehexahydroterephthalamide was inferior to the copolyamides of Example 1 and 2 in mechanical properties at circumambient temperatures above 100° C.

COMPARATIVE EXAMPLE 4

A mixture of 50 parts by weight of 11T(H) salt and 50 parts by weight of 6T(H) salt was added together with 35 parts by weight of deionized water into the polymerization vessel and melt polymerization of the mixture was attempted using a process similar to that of Example 1. However, solidification of the mixture occurred during the polymerization process and stable melt-polymerization proved to be almost impossible.

COMPARATIVE EXAMPLE 5

A mixture of 80 parts by weight of 11T(H) salt and 20 parts by weight of ε-caprolactum was polymerized as described in Example 1. The copolyamide thus obtained had the following properties:

| | |
|---|---|
| Relative viscosity: | 2.46 |
| Melting point: | 265° C. |
| Glass transition temperature: | 82° C. |
| Heat distortion temperature: (18.56 kilograms/centimeters$^2$) | 78° C. |
| Tensile strength at yield: | 670 kilograms/centimeter$^2$ |
| Flexural strength: | 905 kilograms/centimeter$^2$ |
| Flexural modulus: | 17,000 kilograms/centimeter$^2$ |

The glass transition temperature and the heat distortion temperature were remarkably deteriorated.

COMPARATIVE EXAMPLE 6

A mixture of 40 parts by weight of 11T(H) salt and 60 parts by weight of undecamethylenediammoniumterephthalate was added together with 25 parts by weight of deionized water to the polymerization vessel and melt polymerization was carried out as in Example 1. The copolyamide thus obtained consisted of 40 percent by weight of 11T(H) units and 60 percent by weight of undecamethyleneterephthalamide units. Ten grams of this copolyamide was placed in a glass ampoule and then heated at 320° C. for 1 to 6 hours in a nitrogen atmosphere. The copolyamide described in Example 1 was similarly treated. After these treatments, the relative viscosity was measured and the results are shown in Table 2. The copolyamide of this comparative example formed some gel and was insoluble in concentrated sulfuric acid after 3 hours treatment at 320° C. and, therefore, had very poor melt-stability. On the other hand, the copolyamide in Example 1 exhibited excellent melt-stability.

TABLE 2

| | Relative viscosity | | | |
|---|---|---|---|---|
| | Before | Annealing Time at 320° C. (hr) | | |
| Sample | annealing | 1 | 3 | 6 |
| Comparative Example 6 | 2.38 | 3.75 | insol.gel | insol.gel |
| Example 1 | 2.41 | 2.45 | 2.43 | 2.46 |

EXAMPLE 3

A mixture of 100 parts by weight of the copolyamide obtained in Example 1 and 45 parts by weight of glass fibers was kneaded at 300° C. using a 65 millimeter diameter extruder. The discharged melt-guts were quenched with water, cut and dried in vacuo prior to molding. Injection molding of the composition was carried out at a cylinder temperature of 320° C. and a mold temperature of 80° C. to produce test-pieces. Mechanical properties of these test-pieces were measured according to ASTM procedures and the results are summarized in Table 3.

EXAMPLE 4 TO 9

Using the method described in Example 3, but varying the kind and amount of the copolyamide and inorganic reinforcing agents, reinforced copolyamide compositions were prepared and test-pieces were molded. The characteristics of the molded test-pieces obtained are summarized in Table 3. In each case, the reinforced copolyamide composition showed excellent mechanical properties.

TABLE 3

| | | Example 3 | Example 4 | Example 5 | Example 6 |
|---|---|---|---|---|---|
| Copolyamide | wt % | 11T(H)/6T(H) = 80/20 | 11T(H)/6T(H) = 70/30 | 11T(H)/6T(H) = 80/20 | 11T(H)/6T(H) = 80/20 |
| Reinforcing agent | | glass fibers | talc | carbon fibers | Wollastonite |
| Contents of reinforcing agent | parts/Nylon 100 parts | 45 | 50 | 45 | 50 |
| Mold temperature | °C. | 80 | 90 | 90 | 80 |
| Tensile strength | kg/cm$^2$ | 1,500 | 1,600 | 2,100 | 1,600 |
| Flexural strength | kg/cm$^2$ | 2,300 | 2,300 | 3,000 | 2,400 |
| Flexural modulus | kg/cm$^2$ | 83,000 | 85,000 | 185,000 | 80,000 |
| Izod impact strength | kg.cm/cm notch | 8 | 6 | 5 | 6 |
| Heat distortion temperature (Load 18.6 kg/cm$^2$) | °C. | 265 | 265 | 265 | 270 |
| Water absorption | wt % | 0.17 | 0.18 | 0.17 | 0.15 |
| Surface gloss of molded articles | | excellent | excellent | good | excellent |

| | | Example 7 | Example 8 | Example 9 |
|---|---|---|---|---|
| Copolyamide | wt % | 11T(H)/6T(H) = 80/20 | 11T(H)/6T(H) = 80/20 | 11T(H)/6T(H) = 75/25 |
| Reinforcing agent | | Calcium carbonate | Glass fibers | Glass fibers |
| Content of reinforcing agent | parts/Nylon 100 parts | 45 | 90 | 30 |
| Mold temperature | °C. | 80 | 95 | 130 |

TABLE 3-continued

| | | | | |
|---|---|---|---|---|
| Tensile strength | kg/cm² | 1,400 | 2,000 | 1,200 |
| Flexural strength | kg/cm² | 2,200 | 3,100 | 1,800 |
| Flexural modulus | kg/cm² | 81,000 | 132,000 | 68,000 |
| Izod impact strength | kg.cm/cm notch | 6 | 9 | 7 |
| Heat distortion temperature (Load 18.6 kg/cm²) | °C. | 260 | 270 | 267 |
| Water absorption | wt % | 0.17 | 0.10 | 0.20 |
| Surface gloss of molded articles | | good | excellent | excellent |

What we claim is:

1. A copolyamide which can be made into molded articles consisting essentially of from about 95 to 65 percent by weight based on all amide units of the copolyamide of undecamethylenehexahydroterephthalamide units and from about 5 to 35 percent by weight based on all amide units of the copolyamide of hexamethylenehexahydroterephthalamide units, said copolyamide having a trans isomer ratio of hexahydroterephthalic acid residues satisfying the equation (I), $$57 \leq \frac{t}{c + t} \times 100 \leq 83 \, (\%) \qquad (I)$$

wherein c+t denotes the content of the hexahydroterephthalic acid units of the copolyamide and t denotes the trans isomer content of the hexahydroterephthalic acid units of the copolyamide.

2. The copolyamide of claim 1 consisting essentially of from about 90 to 70 percent by weight of undecamethylenehexahydroterephthalamide units and from about 10 to 30 percent by weight of hexamethylenehexahydroterephthalamide units.

3. A copolyamide as claimed in claim 1 or 2, having a relative viscosity measured at 25° C. in 98 percent sulfuric acid at a concentration of 1.0 gram/100 milliliters of from about 1.5 to 5.0.

4. A copolyamide as claimed in claim 1 or 2, further comprised of additives selected from the group consisting of pigments, dyes, flame retarding agents, heat stabilizers, antioxidants, light stabilizers, lubricants, mold-releasing agents, antistatic agents, plasticizers and nucleating agents.

5. The copolyamide molding composition of claim 4 wherein said inorganic reinforcing agent is selected from the group consisting of glass fibers, asbestos fibers, carbon fibers, calcium metasilicate, talc, calcium carbonate, magnesium oxide, aluminum oxide, mica, glass beads and potassium titanate whiskers.

6. A copolyamide molding composition consisting essentially of (a) about 100 parts by weight of a copolyamide which can be made into molded articles consisting essentially of from about 95 to 65 percent by weight of undecamethylenehexahydroterephthalamide units and from about 5 to 35 percent by weight of hexamethylenehexahydroterephthalamide units, said copolyamide having a trans isomer ratio of hexahydroterephthalic acid residues satisfying the equation (I), $$57 \leq \frac{t}{c + t} \times 100 \leq 83 \, (\%) \qquad (I)$$

wherein c denotes the cis isomer content and t denotes the trans isomer content and (b) from about 10 to 100 parts by weight of an inorganic reinforcing agent.

* * * * *

UNITED STATES PATENT AND TRADEMARK OFFICE
CERTIFICATE OF CORRECTION

PATENT NO. : 4,471,088
DATED : September 11, 1984
INVENTOR(S) : Kazumasa Chiba, Nobuo Kato & Kazuhiko Kobayashi It is certified that error appears in the above-identified patent and that said Letters Patent is hereby corrected as shown below:

Column 2, line 50, "96" should read --95--.

Signed and Sealed this

Twenty-third Day of April 1985

[SEAL]

Attest:

DONALD J. QUIGG

Attesting Officer     Acting Commissioner of Patents and Trademarks